(No Model.)
E. F. ORNER.
PLANT PROTECTOR.
No. 592,640. Patented Oct. 26, 1897.
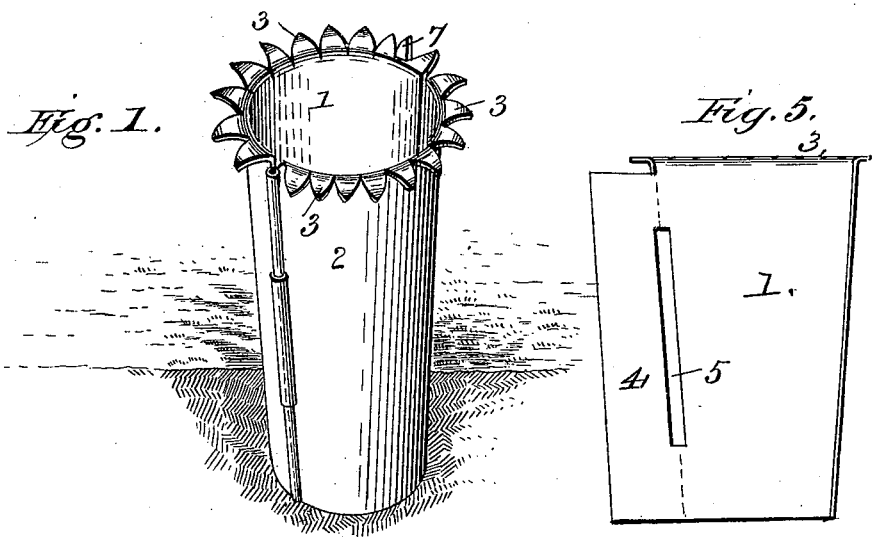
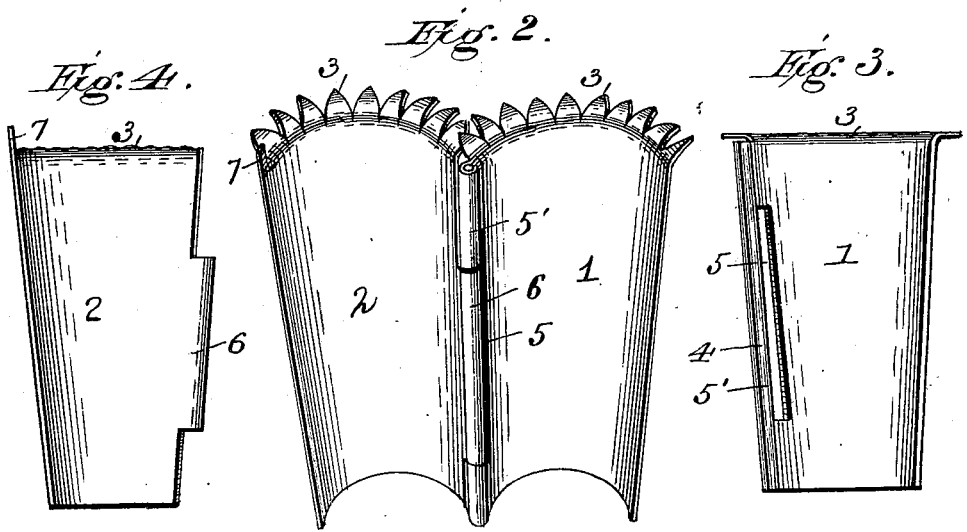
Witnesses:
Franck L. Durand
Kenneth J. Stone
Inventor:
Ellis F. Orner,
by James Sanger
Attorneys
THE NORRIS PETERS CO., PHOTO-LITHO., WASHINGTON, D. C.

UNITED STATES PATENT OFFICE.

ELLIS F. ORNER, OF GOWEN CITY, PENNSYLVANIA.

PLANT-PROTECTOR.

SPECIFICATION forming part of Letters Patent No. 592,640, dated October 26, 1897.

Application filed December 8, 1896. Serial No. 614,922. (No model.)

*To all whom it may concern:*

Be it known that I, ELLIS F. ORNER, a citizen of the United States, and a resident of Gowen City, in the county of Northumberland and State of Pennsylvania, have invented certain new and useful Improvements in Plant-Protectors; and I do hereby declare that the following is a full, clear, and exact description of the invention, which will enable others skilled in the art to which it appertains to make and use the same, reference being had to the accompanying drawings, which form a part of this specification.

My invention relates to improvements in plant-protectors; and its object is to provide an improved construction of the same which shall possess superior advantages with respect to efficiency in use.

The invention consists, essentially, in two cylindrical or tapering concavo-convex sections hinged together at one edge, so that when closed around a plant they will form a protector for the same, as will be hereinafter fully described and claimed.

In the accompanying drawings, Figure 1 is a perspective view of a plant-protector constructed in accordance with my invention. Fig. 2 is a similar view showing the same opened. Figs. 3 and 4 are elevations showing the two sections detached or disconnected from each other. Fig. 5 is a detail view of one of the sections before being bent into shape. Fig. 6 is a plan view of the device. Fig. 7 is a longitudinal section of the same.

In the said drawings the reference-numerals 1 and 2 designate the two sections comprising the protector. These sections are made of metal, concavo-convex in form, and tapering from the bottom to the top. At the upper end or top each of these sections is formed with a number of triangular-shaped tongues 3 at right angles to the body portion thereof. One of these sections at the inner edge is formed with an extension 4 and with a slot 5. This extension is rolled or bent over into cylindrical shape, forming a pintle 5'. The other section 1 is formed with a tongue 6, which is passed through the slot 5 and bent around the pintle, making a hinge-joint.

It will be seen that the slot 5 is of greater length than the tongue 6, so that section 1 can have a slight vertical movement. At the upper end of section 2 is formed a projection 7, which, when the sections are clasped around a plant with their free edges overlapping each other, will engage with one of the tongues 3 and hold the sections in their closed position. By moving the section 1 downward, which can be accomplished by reason of the elongated slot 5, the catch or projection will be disengaged, when the sections can be opened.

In practice the device is placed around a plant and locked, as aforesaid, and affords a complete protection to the stalks or stems of the same and holds the leaves away from the ground.

Having thus fully described my invention, what I claim is—

In a plant-protector, the combination of the concavo-convex sections, having outwardly-projecting triangular projections at the upper end, one of said sections formed with an elongated slot and an extension, which is rolled or bent forming a cylindrical pintle, and the other section formed with a tongue extended through said slot and then bent around the pintle and movable vertically thereon, and said last-mentioned section formed at the upper end with an upwardly-extending projection adapted to engage between two of the triangular projections of the other section to hold said sections in a closed position, substantially as described.

In testimony that I claim the foregoing as my own I have hereunto affixed my signature in presence of two witnesses.

ELLIS F. ORNER.

Witnesses:
AUGUST PETERSON,
SHIPLEY BRASHEARS, Jr.